(12) United States Patent
Brockhaus

(10) Patent No.: US 6,453,755 B1
(45) Date of Patent: Sep. 24, 2002

(54) MAGNETO-INDUCTIVE FLOW-MEASURING METHOD

(76) Inventor: Helmut Brockhaus, Sebastianstrasse 38, Dinslaken (DE), 46535

( * ) Notice: Subject to any disclaimer, the term of this patent is extended or adjusted under 35 U.S.C. 154(b) by 11 days.

(21) Appl. No.: 09/634,521

(22) Filed: Aug. 8, 2000

(30) Foreign Application Priority Data

Aug. 16, 1999 (DE) .......................................... 199 38 160

(51) Int. Cl.$^7$ .............................. G01F 1/58; G01F 1/60
(52) U.S. Cl. .................................. 73/861.11; 73/861.17
(58) Field of Search .......................... 73/861.11, 861.17

(56) References Cited

U.S. PATENT DOCUMENTS

| | | | | |
|---|---|---|---|---|
| 3,802,263 A | * | 4/1974 | Krechmery et al. ... | 73/194 EM |
| 3,943,765 A | * | 3/1976 | Takada et al. ......... | 73/194 EM |
| 4,106,337 A | * | 8/1978 | Trietlet, Jr. ........... | 73/194 EM |
| 4,157,035 A | * | 6/1979 | Doll et al. .............. | 73/194 EM |
| 4,458,542 A | * | 7/1984 | Cushing .................. | 73/861.17 |
| 4,459,857 A | * | 7/1984 | Murray et al. ........... | 73/861.12 |
| 4,766,770 A | * | 8/1988 | Manherz et al. ......... | 73/861.17 |
| 5,079,957 A | * | 1/1992 | Wehrs ..................... | 73/861.17 |
| 5,301,556 A | | 4/1994 | Nissen et al. ............ | 73/861.15 |

FOREIGN PATENT DOCUMENTS

DE 219 725 A1 4/1987

OTHER PUBLICATIONS

Patent Abstracts of Japan. Mitsutake Ichiro, Two–Wire Type Electromagnetic Flowmeter. Application No. 06187170, filed Aug. 9, 1994.

Patent Abstracts of Japan. Mochizuki Tsutomu, Electromagnetic Flowmeter. Application No.: 07200159, filed Aug. 7, 1995.

Patent Abstracts of Japan. Ichirou Wada, Processing of Output of Electromagnetic Type Flow Meter. Application No.: 54–22550, filed Mar. 1, 1979.

Patents Abstracts of Japan. Terutaka Hirata, Electromagnetic Flowmeter. Application No.: 56–212524, filed Dec. 29, 1981.

Patents Abstract of Japan. Hiroshi Watanabe, Electromagnetic Flowmeter. Application No.: 59–139143, filed Jul. 6, 1984.

\* cited by examiner

*Primary Examiner*—Benjamin R. Fuller
*Assistant Examiner*—Lilybett Martir

(57) ABSTRACT

A magneto-inductive flow-measuring method for moving fluids, whereby the field coils generating the magnetic field are energized in gapped fashion and each measuring period includes a positive half-cycle of the magnetic field and a negative half-cycle of the magnetic field. The magneto-inductive flow-measuring method saves energy while at the same time permitting the simple and precise definition of the measuring signal by virtue of the fact that the measuring periods additionally include a section preceding the first half-cycle of the magnetic field and a section following the last half-cycle of the magnetic field, and that the additional signals measured therein are used to quantify an interference signal superposed over the measuring signal and to correct the measuring signal accordingly.

6 Claims, 9 Drawing Sheets

MAGNETO-INDUCTIVE FLOW-MEASURING METHOD

BACKGROUND OF THE INVENTION

This invention relates to a magneto-inductive flow-measuring method for moving fluids, whereby the magnetizing field coils generating the magnetic field are energized in gapped fashion and each measuring period encompasses a positive half-cycle of the magnetic field and a negative half-cycle of the magnetic field.

The fundamental operating principle of a magneto-inductive flowmeter for moving fluids goes all the way back to Faraday who in 1832 suggested employing electrodynamic induction for measuring flow rates. According to Faraday's law of induction, an electric field intensity perpendicular to the direction of flow and to the magnetic field is generated in a flowing medium containing charge carriers and passing through a magnetic field. In a magneto-inductive flowmeter this law is applied by using a magnet, generally consisting of two magnet coils, which generates a magnetic field perpendicular to the flow direction in the measuring tube. Within this magnetic field, each volume element traveling through the magnetic field of the moving fluid contributes its built-up field intensity to the measuring voltage collected by way of the test electrodes. In conventional magneto-inductive flowmeters, these test electrodes are designed for either galvanic or capacitive coupling with the moving fluid. One particular characteristic of magneto-inductive flowmeters is the proportionality between the measuring voltage and the flow rate of the fluid, averaged across the cross section of the pipe, i.e. between the measuring voltage and the volumetric flow.

The magnetic field of a magneto-inductive flowmeter is generated by feeding an energizing current to the two magnet coils. This approach is susceptible to measuring-signal errors due to a less than ideal energizing current and to irregularities in the flowing medium itself. The latter are attributable for instance to electrochemical interference caused by reactions between the electrodes and the moving fluid. Typically encountered in situations of this nature are low-frequency interference signals overlapping the measuring signal. In traditional magneto-inductive flowmeters operating in a continuous mode, i.e. where the excitation current energizing the magnet coils alternates between positive and negative without any intervals between the positive and negative half-cycles, these low-frequency interference signals affecting the measuring signals can be compensated for by the interpolation of a simple filter which is capable of suppressing linear drifts superposed on the measuring signal.

For example, to permit the operation of a battery-powered magneto-inductive flowmeter it may be desirable to minimize the overall energy consumption of the magneto-inductive flowmeter. Most of the energy is used up by the field coils as they generate the magnetic field. To address that problem, U.S. Pat. No. 4,766,770 proposes gapped energizing of the field coils generating the magnetic field. The excitation current and thus the measuring signal are composed of cycles or periods with a positive and a negative half-cycle, with the individual periods separated by idle intervals during which no energizing takes place. A measured value can be delivered only after a full period since each such value must consist of at least two half-cycles. However, the last half-cycle of a period is separated too far from the first half-cycle of the next-following period by the intervening idle interval, to allow for the evaluation of a measuring signal based on these two half-cycles.

The measured value associated with the two half-cycles of a measuring period is defined as the value that represents the area covered by the measuring signal relative to the zero line. The selection of the zero line relative to the measuring signal is not critical for as long as the area covered by the positive half-cycle is evaluated as positive and the area covered by the negative half-cycle is evaluated as negative. For simplicity's sake, the assumptions here and in the following description are based on a linear interference which at least in a first approximation corresponds to the interferences encountered in an actual measuring operation. However, in determining the measured value, such linear interference signals heterodyned over the measuring signal pose the following problems:

In the case of a signal with an interference that has a negative slope, the area values below the curve of the measuring signal are somewhat larger than those of a clean signal. The opposite is the case for a signal superposed by an interference with a positive slope, where each of the areas covered by a half-cycle is too small by a certain value.

SUMMARY OF THE INVENTION

It is the objective of this invention to introduce a magneto-inductive flow-measuring method which saves energy while at the same time permitting simple and precise determination of the measuring signal even when the measuring signal is overlapped by an interference signal, as well as a magneto-inductive flowmeter serving that purpose.

According to a first conceptual aspect of this invention, the problem first above mentioned is solved by providing for the measuring periods to include an area before each first half-cycle of the magnetic field and an area after the last half-cycle of the magnetic field, by using the field intensities measured therein for quantifying an interference signal superposed over the measuring signal, and by correcting the measuring signal correspondingly. The extra signals in the areas preceding the first half-cycle and, respectively, following the last half-cycle would have to be zero since no magnetic field regenerated that would induce a field intensity of the flowing medium, so that any extra, non-zero signals actually captured due to the drift overlay over the measuring signal provides the information on the interference which can be used for appropriately adjusting the measuring signal.

A particularly simple and effective correction offers itself by virtue of the fact that the measuring periods are, in each case, composed of exactly one positive half-cycle of the magnetic field and exactly one negative half-cycle of the magnetic field, that during the positive half-cycle of the magnetic field and during the negative half cycle of the magnetic field the measuring signal is upslope-integrated, producing the measured subvalues $U_1$ and $U_2$, respectively, that during a time span corresponding to the duration of a half-cycle directly before the first half-cycle of the magnetic field and corresponding to the duration of a half-cycle directly following the last half-cycle of the magnetic field is upslope-integrated, producing the measured subvalues $U_{1a}$, and $U_{2a}$, respectively, and that the measured value W associated with a given measuring period is calculated according to this equation:

$$W = U_1 - U_2 - \tfrac{1}{3}(U_{1a} - U_{2a})$$

A particularly simple transition into a possibly desired continuous measuring process is obtainable when the measuring periods always begin with the same half-cycle, i.e. either always with the positive half-cycle or always with the negative half-cycle.

According to another conceptual aspect of this invention, the problem first above mentioned is solved in that the measuring periods always include the same, even number of half-cycles, that the consecutive measuring periods begin in alternating fashion with a positive half-cycle of the magnetic field or, respectively, a negative half-cycle of the magnetic field, and that the measuring signal is determined by averaging the values measured during the consecutive measuring periods. Since in this case the measured value thus determined will be slightly too high whenever the measuring period begins with a positive half-cycle, and slightly too low whenever the measuring period begins with a negative half-cycle, the interference superposed on the measuring signal will be essentially averaged out as a function of time.

The method described above is made particularly simple and effective in that the measuring periods consists, in each case, of exactly one positive half-cycle of the magnetic field and exactly one negative half-cycle of the magnetic field, that during the positive half-cycle of the magnetic field and during the negative half-cycle of the magnetic field of the measuring signal is, in each case, upslope-integrated into measured subvalues, and that for the determination of the measured value the series of values derived from the respective difference between the measured subvalues during the positive half-cycle of the magnetic field and, respectively, during the negative half-cycle of the magnetic field is subjected to low-pass filtering.

According to another conceptual aspect of this invention, the problem first above mentioned is solved in that the measuring periods consist in each case of an odd number of half-cycles of the magnetic field and the measured value is averaged in each measuring period. When in a given measuring period all consecutive half-cycles, i.e. always one positive half-cycle together with one negative half-cycle, are used for determining a measured subvalue through averaging, an odd number of half-cycles in a measuring period will result in exactly as many subvalues being determined as too large, meaning those where the negative half-cycle follows the positive half-cycle, as subvalues are determined as being too small, meaning those where the positive half-cycle follows the negative half-cycle. Overall, as a result, all of the interference signal superposed over the measuring signal will essentially be identified by averaging.

The method described above is made particularly simple and effective in that the measuring periods are each composed of exactly three half-cycles of the magnetic field, that during the three half-cycles of the magnetic field the measuring signal is upslope-integrated, producing measured subvalues $U_1$, $U_2$ and $U_3$, respectively, and the measured value W associated with any given measuring period is calculated according to the equation $$W=0,5\ (U_1-2U_2+U_3)$$

if the measuring period includes two positive half-cycles, or it is calculated according to the equation $$W=0,5\ (-U_1+2U_2-U_3)$$

if the measuring period includes two negative half-cycles. In the process a particularly simple transition offers itself into a possibly desired continuous measuring procedure when the measuring periods begin alternatingly with the positive half-cycle or with the negative half-cycle, respectively.

Another object of this invention is a magneto-inductive flow-measuring method whereby the field coils generating the magnetic field are continuously energized. According to the invention, the characteristic feature of this method lies in the fact that the energizing current fed to the field coils is controlled in such fashion that during a full cycle, it attains a predetermined maximum positive value and a quantitatively identical predetermined maximum negative value, that the predetermined maximum positive value and the predetermined maximum negative value of the excitation i.e. energizing current are calibrated for the magnetic field to be produced, and that in a predetermined sequence at least two mutually different, calibrated energizing currents are employed. In this fashion and by virtue of the continuous operation of the magneto-inductive flowmeter, continuous measured values will also be available serving, for instance, to eliminate, by methods such as averaging, an interference signal overlaying the measuring signal, while at the same time the power consumption of the magneto-inductive flowmeter is reduced due to the fact that during its operation the energizing current is modified in the form of substantial intermittent reduction.

Yet modifying the energizing current during the operation of a megneto-inductive flowmeter poses a problem insofar as the relationship between the magnetic field and the energizing current is nonlinear. This would normally require the addition of expensive sensors for the magnetic field serving to regulate the energizing current at desired levels. According to this invention, however, at least two mutually different, calibrated energizing currents are employed. These energizing currents are controlled in a way as to arrive at a compromise between energy conservation on the one hand, i.e. using as often as possible the lowest energizing currents possible, while on the other hand obtaining the highest possible data density from the measuring signal so as to eliminate to the most effective level possible any superposed interference signals.

In both cases, i.e. when the field coils generating the magnetic field are energized in gapped fashion as well as for continuous operation of the field coils, the problem first above mentioned is also solved by a magneto-inductive flowmeter in which, by means of suitable parameters preferably s et through local operator intervention or by automatic adaptive recognition of the measuring conditions, one or the other of the methods offered by this invention is selectable.

BRIEF DESCRIPTION OF THE DRAWINGS

There are different individual possibilities to implement and further enhance the magneto-inductive flow-measuring methods according to this invention as described above, as well as the magneto-inductive flowmeter according to this invention serving to apply these methods. In this context, reference is made to the dependent claims following the independent patent claims and to the description of the preferred embodiments in connection with the drawings, in which:

DESCRIPTION OF THE PREFERRED EMBODIMENTS

Figure 1A:
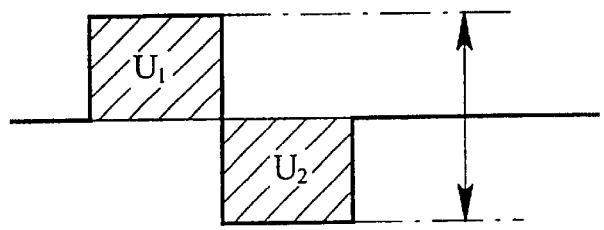
FIG. 1a shows in schematic form a full cycle of an interference-free signal.

Depicted in FIG. 1a is a measuring signal obtained in the gapped operation of a magneto-inductive flowmeter with exactly identical positive and negative excitation per measuring period. The measured value associated with the measuring period represents the area covered by the measuring signal relative to the zero line. The position of the zero line is random-selectable; in the case at hand, it has been selected so as to be located exactly between the maximum positive measuring signal and the maximum negative measuring signal. Accordingly, the measured value W associated with the measuring period is derived from the sum of the surface integrals of the individual half-cycles of the measuring signal, in this case $$W=U_1-U_2.$$

Figure 1B:
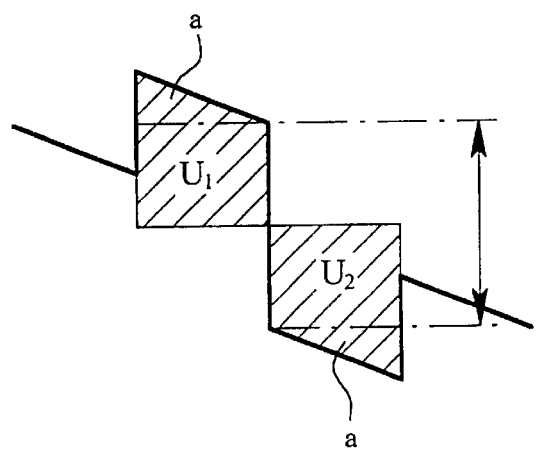
FIG. 1b shows in schematic form an error situation of a full signal cycle where the interference pattern has a negative slope.
Figure 1C:
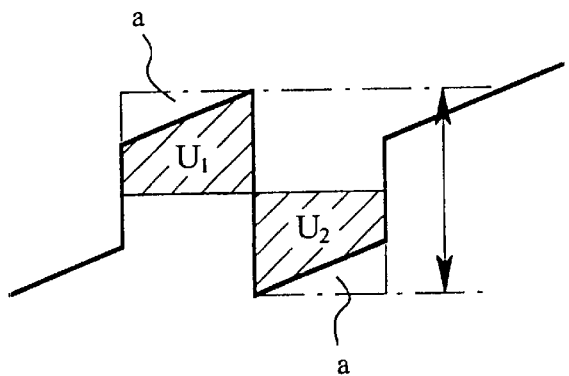
FIG. 1c shows in schematic form an error situation of a full signal cycle where the interference pattern has a positive slope.
Figure 2:
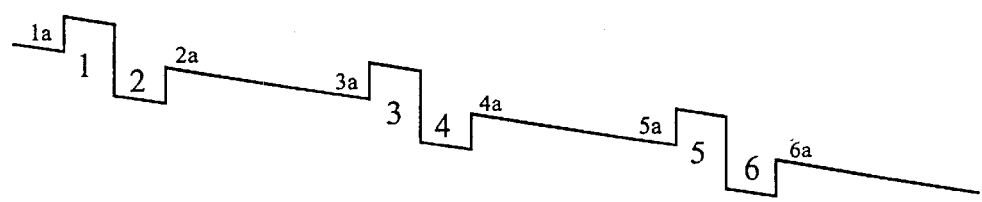
FIG. 2 shows in schematic form an interference-affected signal in gapped operation with additional measurements taken before and after the individual measuring periods in accordance with the first embodiment of this invention.

However, the measured value thus established for a given measuring period is subject to errors in the event that an interference signal is superposed over the measuring signal. Error situations of this type are illustrated in FIGS. 1b and 1c, where for simplicity's sake the examples show linear interferences with either a rising or a falling slope. As can be seen in FIG. 1b, a linearly declining interference signal overlaid over the measuring signal will result in a measured value too high by twice the amount a. In contrast thereto, as shown in FIG. 1c, a measuring signal that is overlaid by a linearly rising interference signal will produce a measured value that is short by twice the amount a. To eliminate this problem in accordance with a first embodiment of this invention, illustrated in FIG. 2, the measured value associated with a given measuring period is determined in that, in addition to the two half-cycles 1 and 2, a measuring period includes a section 1a preceding the first half-cycle of the magnetic field and a section 2a following the last half-cycle of the magnetic field. In section 1a as well as well as in section 2a, the measuring signal is in each the measuring signal is, in each case, upslope-integrated during a time span corresponding to the duration of a half-cycle, case upslope-integrated during a time span corresponding to the duration of a half-cycle, producing measured subvalues $U_{1a}$ and $U_{2a}$, respectively. The measured value W for a given measuring period is then calculated using the equation $$W=U_1-U_2-\tfrac{1}{3}(U_{1a}-U_{2a}).$$

Figure 3:
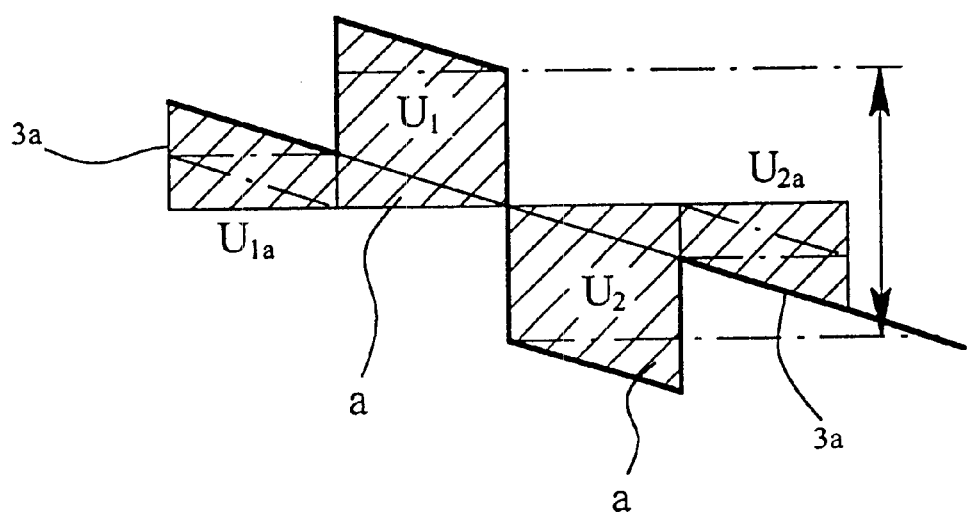
FIG. 3 shows in schematic form an error situation of a full signal cycle where the interference pattern has a negative slope and additional measurements are taken before and after the energizing period.

In the case of a strictly linear interference signal, this will result for the measured value of a given measuring period in a total elimination of that interference signal, as is schematically illustrated in FIG. 3. The measured subvalues $U_1$ and $U_2$ will be too large by the amount a, while the measured subvalues $U_{1a}$ and $U_{2a}$ in front of the first and, respectively, behind the last half-cycle will be exactly 3a. With this fact established, it is now possible in accordance with the first embodiment of this invention to use the values $U_{1a}$ and $U_{2a}$, measured outside the actual excitation period, for appropriately correcting the interference-affected measuring signal.

Figure 4:
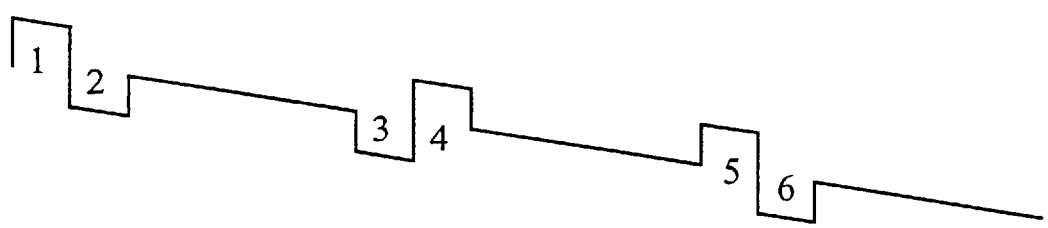
FIG. 4 shows in schematic form an interference-affected signal in gapped operation, in which, according to the embodiment of this invention, the excitation takes place during each measuring period alternating between first positive and first negative.
Figure 5A:
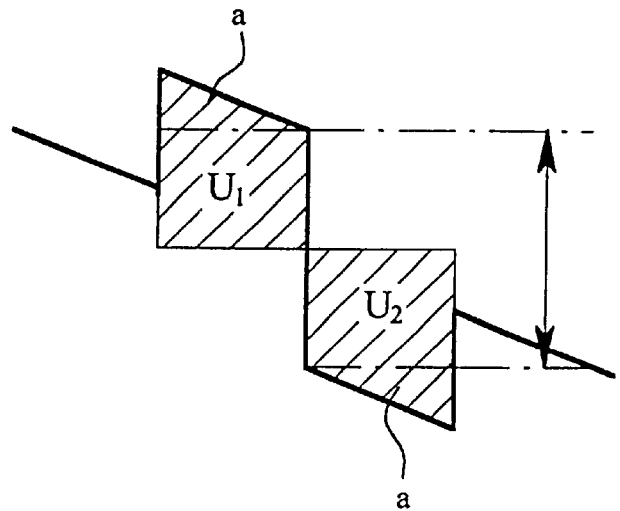
FIG. 5a shows in schematic form an error situation of a full cycle of a signal beginning with the positive half-cycle where the interference pattern has a negative slope.
Figure 5B:
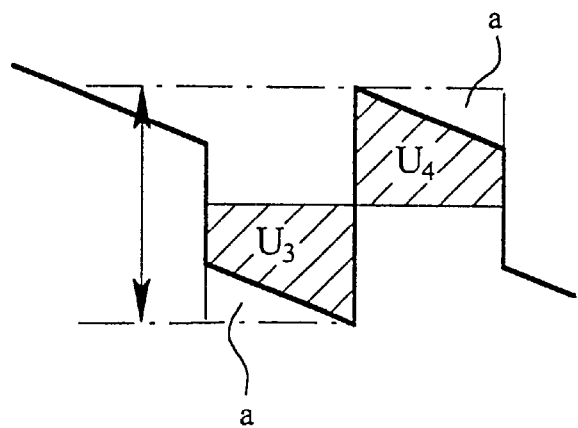
FIG. 5b shows in schematic form an error situation of a full cycle of a signal beginning with the negative half-cycle where the interference pattern has a negative slope.

FIG. 4 illustrates a second embodiment of this invention. In this case, the excitation takes place during a measuring period precisely encompassing a positive half-cycle and a negative half-cycle. However, the sequence of the half-cycles in consecutive measuring periods is switched, i.e. the measuring periods alternate in beginning with the positive half-cycle or, respectively, with the negative half-cycle. FIG. 5a shows that, when the measuring period begins with the positive half-cycle, the measured value for the measuring period concerned will be too high by twice the value a. When the measuring period begins with the negative half-cycle as shown in FIG. 5b, the measured value associated with that measuring period will be too low by twice the amount a. This fact is utilized according to the second embodiment of this invention in that the series of measured values associated with consecutive measuring periods can be used for the determination of the overall measured value by low-pass-filtering that series of measured values.

Figure 6:
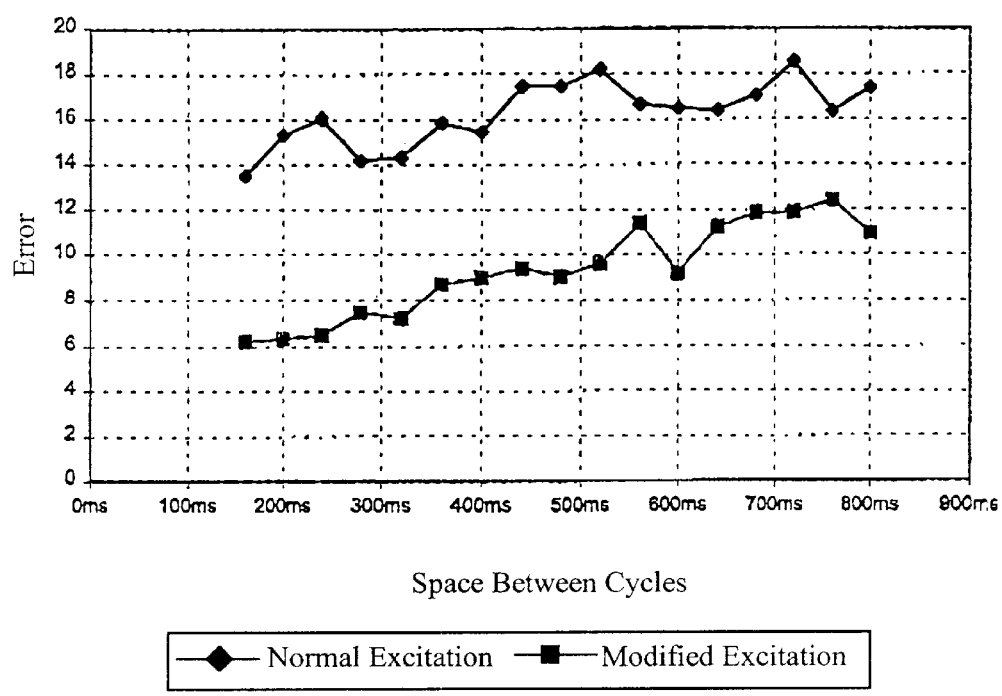
FIG. 6 is a plot showing the error of a measured value as a function of the time intervals between the measuring periods with normal excitation and, respectively, as energized in accordance with the second embodiment of this invention.

FIG. 6 shows a plot of the error in the measured value as a function of the time spacings between measuring cycles with normal excitation according to prior art and, respectively, as energized and measured in accordance with the second embodiment of this invention. As can be seen, it is possible, virtually independent of the time intervals between the measuring periods, to essentially cut the measuring error in half.

Figure 7:
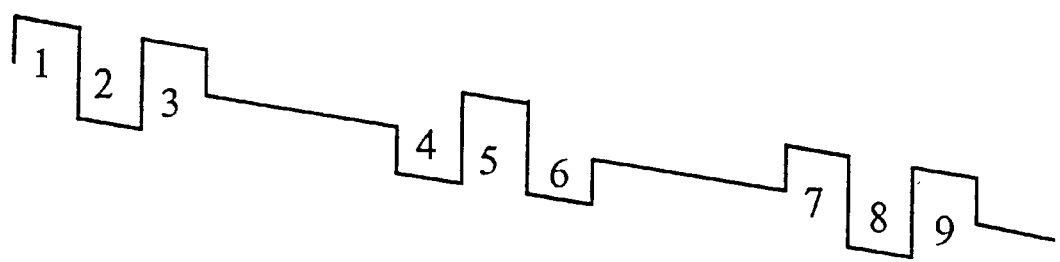
FIG. 7 shows in schematic form an interference-affected signal in gapped operation in which, according to the third embodiment of this invention, the excitation takes place in each measuring period via three half-cycles.
Figure 8:
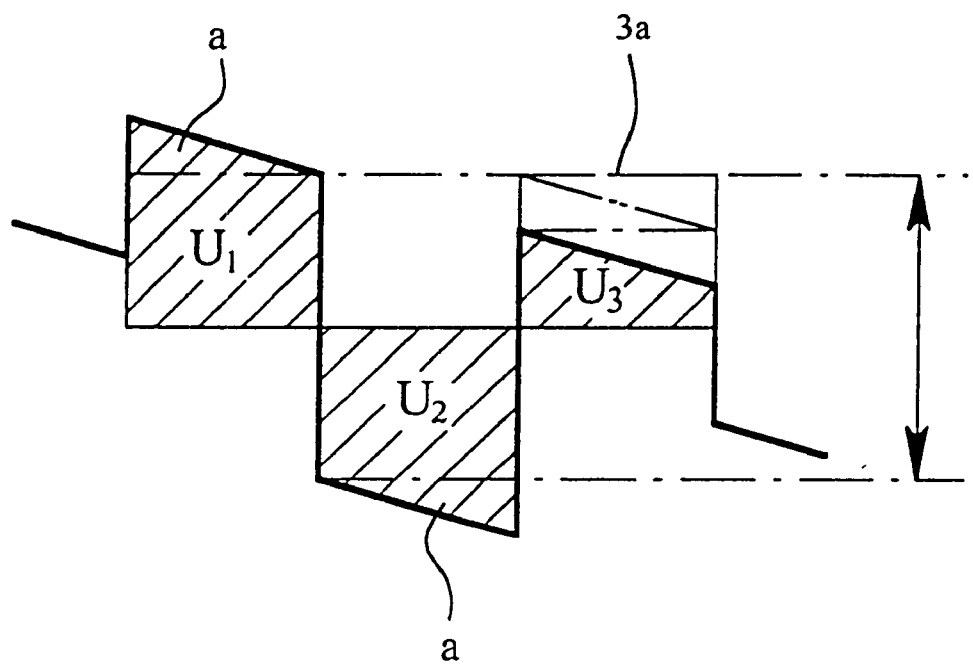
FIG. 8 shows in schematic form an error situation with three signal half-cycles in one measuring period where the interference pattern has a negative slope.

FIG. 7 shows a measuring signal whose individual measuring periods each consist of exactly three half-cycles. For this type of signal with an overlaid, linearly falling interference pattern, the error situation relative to the measured value obtained is schematically illustrated in FIG. 8. While the measured subvalues $U_1$ and $U_2$ are, in each case too large by the amount a, the measured subvalue $U_3$ is too small by exactly the amount 3a. The third embodiment of the invention takes advantage of this fact for calculating the measured value W of the measuring signal as corrected for the superposed interference signal, using the equation $$W=0,5(U_1-2U_2+U_3)$$

whenever the measuring period includes two positive half-cycles, and using the equation $$W=0,5(-U_1+2U_2-U_3)$$

whenever the measuring period includes two negative half-cycles. In the case of a strictly linear interference, that interference signal will thus be totally eliminated.

Figure 9:
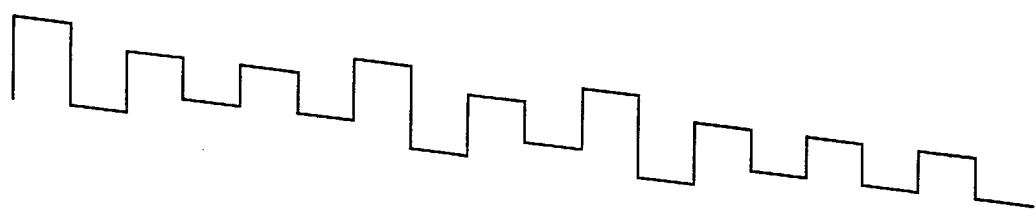
FIG. 9 shows an interference-affected signal in a measuring operation involving excitation with different energizing currents according to the fourth embodiment of this invention.

FIG. 9 shows a measuring signal obtained with continuous excitation in accordance with a fourth embodiment of this invention. In order to be able, notwithstanding the continuous energizing of the field coils generating the magnetic field, to operate the magneto-inductive flowmeter in energy-saving fashion, the excitation current for the field coils is controlled in such fashion that during a full period, i.e. during two consecutive positive or negative half-cycles, it attains a predetermined maximum positive value in the positive half-cycle and a quantitatively equivalent, predetermined maximum negative value in the negative half-cycle. The predetermined maximum positive value and the predetermined maximum negative value of the excitation current are suitably calibrated for the magnetic field to be generated. In operating the magneto-inductive flowmeter, this obviates the need for any sensors that would serve to regulate the excitation current required for the field coils to the desired level for the magnetic field.

Since the relationship between the magnetic field generated and the excitation current is complex, especially meaning nonlinear, the excitation currents to be employed are calibrated for the magnetic fields to be obtained prior to actual operation of the magneto-inductive flowmeter. This allows the excitation currents to be so controlled that, in alternating fashion, larger and smaller magnetic fields can be generated, saving all the more energy, i.e. excitation current, the more often smaller magnetic fields are employed. In this manner, for each measuring situation it is possible to arrive at a compromise between high data density for the elimination of an interference signal superposed on a measuring signal by means of various averaging procedures, and the conservation of energy by generating only small magnetic fields.

For the implementation of the methods according to the above-described examples according to this invention, a magneto-inductive flowmeter is introduced which not only permits the implementation of all of these methods but also, in adaptating to the measuring requirement in question, allows the selection of the method best suited to the task. This can be accomplished in that the operator of the magneto-inductive flowmeter, on the basis of his/her technical assessment of the measuring requirements, uses a suitable switching device on the magneto-inductive flowmeter for selecting one of the methods described above. Alternatively, a magneto-inductive flowmeter can be so designed that it automatically analyzes the measuring conditions, for instance after conducting test measurements prior to the actual measuring operation, employing the various available measuring methods, and then decides which of these measuring methods delivers the best error correction.

What is claimed is:

1. A magneto-inductive flow measuring method for a moving fluid comprising the steps of
   providing field coils for generating a magnetic field to which the fluid is exposed;
   providing means collecting a measuring signal proportional to the flow rate of the fluid;
   energizing the field coils in a gapped fashion so that each measuring period includes exactly one positive half-cycle of the magnetic field and exactly one negative half-cycle of the magnetic field and the measuring periods additionally encompass a time interval preceding the first half-cycle of the magnetic field and a time interval following the last half-cycle of the magnetic field;
   during the first positive half-cycle of the magnetic field and during the last negative half-cycle of the magnetic field, up-slope integrating the measuring signal so as to produce measured subvalues $U_1$ and $U_2$, respectively;
   during a time span corresponding to the duration of a half-cycle, up-slope integrating the measuring signal immediately before the first half-cycle, of the magnetic field;
   during a time span corresponding to the duration of a half-cycle, up-slope integrating the measuring signal immediately following the last half-cycle of the magnetic field so as to produce measured subvalues $U_{1a}$ and $U_{2a}$, and calculating the measured value W associated with a given measuring period according to the equation $W=U_1-U_2-\frac{1}{3}(U_{1a}-U_{2a})$.

2. The method as in claim 1, wherein the measuring periods always begin with the same half-cycle, i.e. either always with the positive half-cycle or always with the negative half-cycle.

3. A magnetic inductive flow-measuring method for a moving fluid comprising the steps of
   providing field coils for generating a magnetic field to which the fluid is exposed;
   providing means for collecting a measuring signal proportional to the flow rate of the fluid;
   energizing the field coils in a gapped fashion so that each measuring period includes a positive half-cycle of the magnetic field and a negative half-cycle of the magnetic field and each measuring period contains an even number of half-cycles, the consecutive measuring periods begin alternatingly with a positive half-cycle of the magnetic field and, respectively, with a negative half-cycle of the magnetic field;
   the measuring signal being determined by averaging the values measured in the consecutive measuring periods.

4. The method as in claim 3, wherein each measuring period consists of exactly a positive half-cycle of the magnetic field and exactly a negative half-cycle of the magnetic field; during the positive half-cycle of the magnetic field and, respectively, during the negative half-cycle of the magnetic field, up-slope-integrating the measuring signal into measuring subvalues, and for defining the measured value, low pass filtering the series of values derived from the respective difference of the measured subvalues during the positive half-cycle of the magnetic field and the negative half-cycle of the magnetic field.

5. A magnetic-inductive flow-measuring method for a moving fluid comprising the steps of
   providing field coils for generating a magnetic field to which the fluid is exposed;
   providing means for collecting a measuring signal proportional to the flow rate of the fluid;
   energizing the field coils in a gapped fashion so that each measuring period includes exactly three half-cycle of the magnetic field; during each one of three half-cycles upslope-integrating the measuring signal so as to produce measured subvalues $U_1$, $U_2$ and $U_3$ respectively, and
   calculating the measured value W associated with each measuring period using the equation $W=0.5(U_1-2U_2+U_3)$ when the measuring period includes two positive half-cycles, or using the equation $W=0.5(-U_1+2U_2-U_3)$ when the measuring period includes two negative half-cycles.

6. The method as in claim 5, wherein the measuring periods begin alternatingly with the positive half-cycle and, respectively, with the negative half-cycle.

* * * * *